United States Patent [19]

Scott

[11] Patent Number: 4,697,834
[45] Date of Patent: Oct. 6, 1987

[54] LAWN DEBRIS ACCUMULATION AND COLLECTION APPARATUS

[76] Inventor: Menzy Scott, 382 Valley Scent Avenue, Scotch Plains, N.J. 07076

[21] Appl. No.: 260,326

[22] Filed: May 4, 1981

[51] Int. Cl.$^4$ .............................................. B62B 11/00
[52] U.S. Cl. .................................. 294/55; 280/47.24; 280/654
[58] Field of Search ........................ 294/55, 19 R, 1 R; 15/257.1, 257.7, 257.9, 104.8; 248/98, 99; 280/34 B, 36 C, 47.24, 47.26, 47.31, 47.33, 47.13, 42, 654; 414/440

[56] References Cited

U.S. PATENT DOCUMENTS

| | | |
|---|---|---|
| 112,727 | 3/1881 | Lum . |
| 1,167,782 | 1/1916 | Richards . |
| 1,182,412 | 5/1916 | Olesburg . |
| 3,106,303 | 10/1963 | Finocchiaro . |
| 3,754,785 | 8/1973 | Anderson . |
| 3,875,981 | 4/1975 | Brenner et al. . |
| 3,936,068 | 2/1976 | Dorman ............................ 280/47.26 |
| 3,936,087 | 2/1976 | Alexander . |
| 3,939,803 | 1/1976 | Paulus . |
| 4,006,928 | 2/1977 | Beugin . |
| 4,312,531 | 1/1982 | Cross ..................................... 294/55 |

*Primary Examiner*—James B. Marbert
*Attorney, Agent, or Firm*—R. Martin Oliveras

[57] ABSTRACT

A lawn debris accumulation and collection apparatus for facilitating the accumulation, collection, and bagging of outdoor debris comprises: a rear frame structure; a front guide-holder structure; a front wheel-support structure; and a plurality of joint locations for connecting common, adjacent elements of the apparatus. In particular, the frame structure includes a plurality of rear, side, upper, and lower straight members; the guide-holder structure includes a front annular member, a central cylindrical member, and rear vertical and horizontal members; the wheel-support structure includes a bottom straight member and wheels at the ends of such bottom straight member; and the plurality of joint locations includes means for mutually connecting at least one end of respective frame structure straight members to other straight members or to such guide-holder structure. A feature of the present invention is that the frame structure lower and cross straight members provide both structural support and debris weight support; and that the guide-holder structure provides structural support, means for guiding the debris in the forward direction, and means for removably attaching the bag to the apparatus.

6 Claims, 5 Drawing Figures

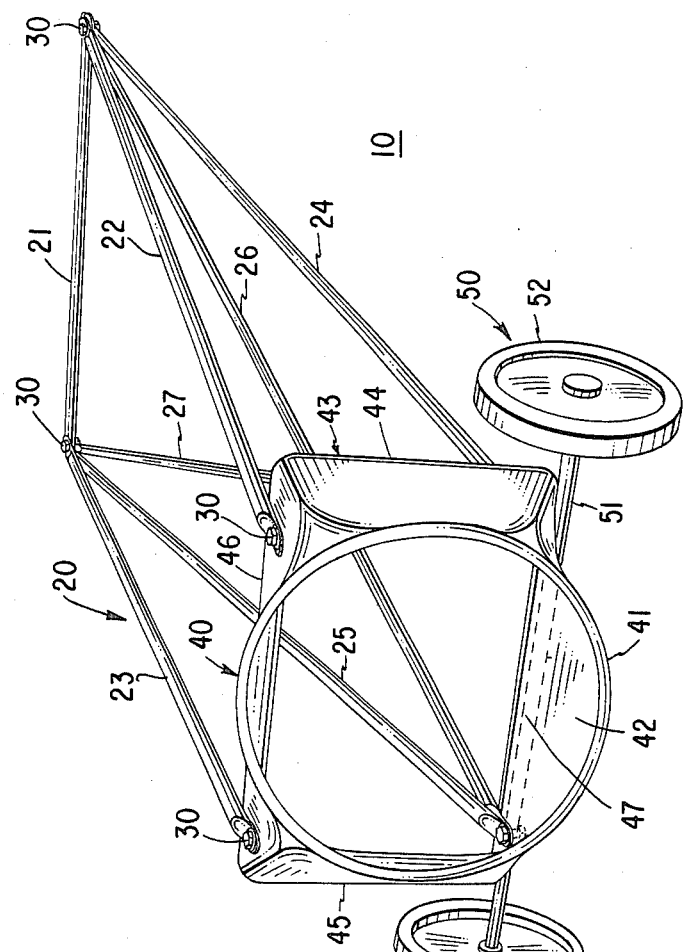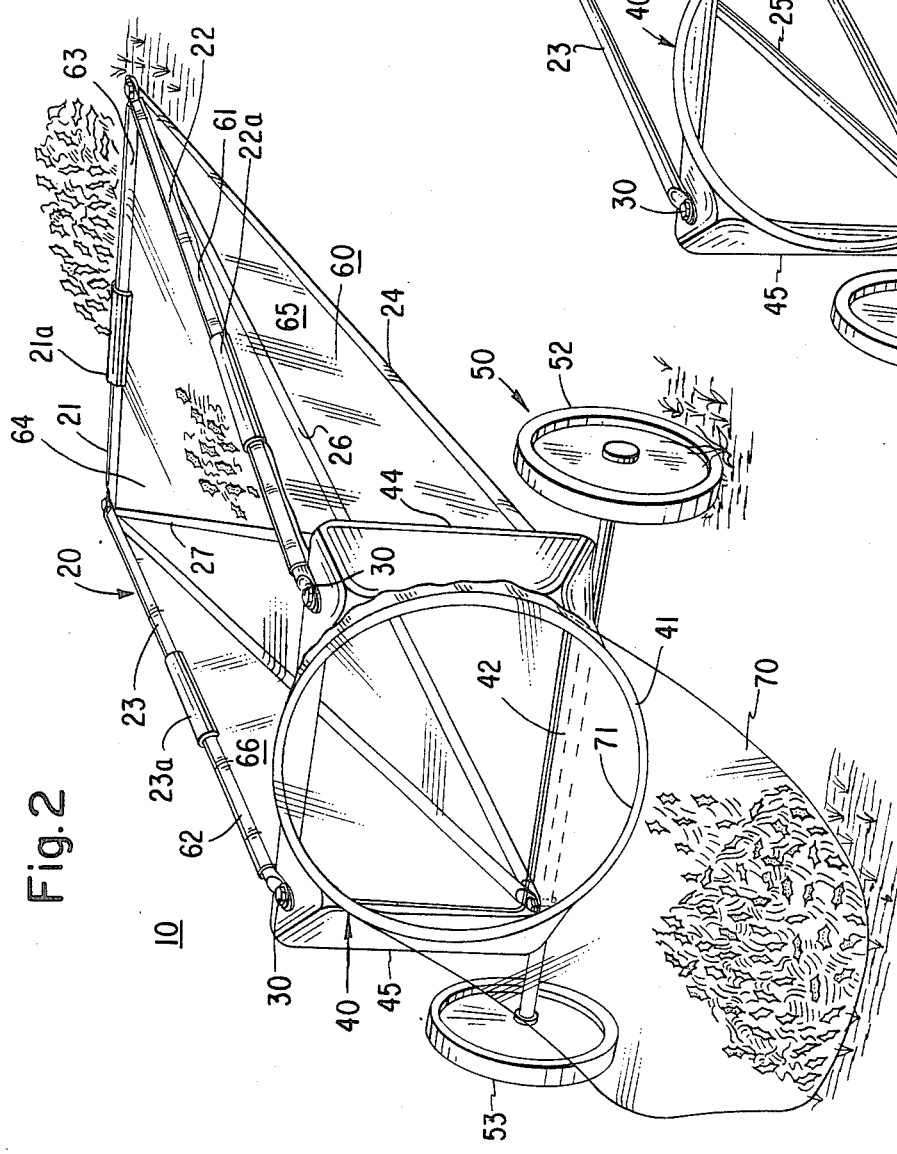

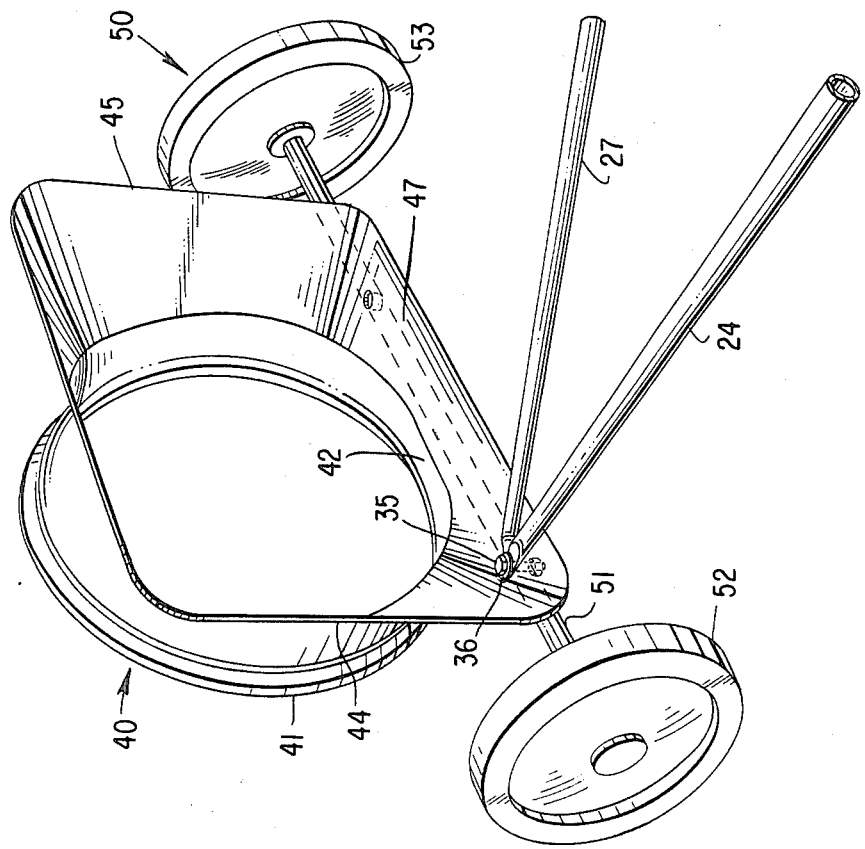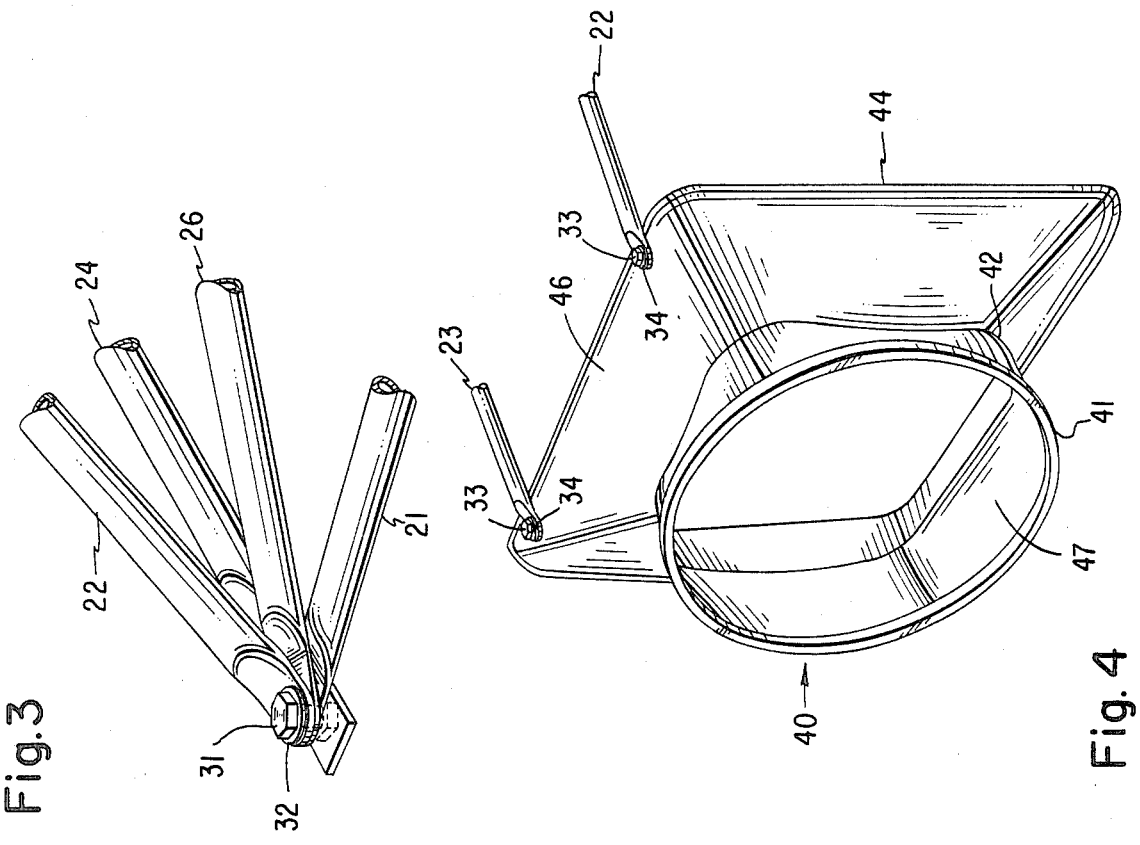

LAWN DEBRIS ACCUMULATION AND COLLECTION APPARATUS

FIELD OF THE INVENTION

This invention relates to debris accumulation and collection apparatus and in particular to such apparatus which is used in conjunction with a flexible plastic bag attached thereto.

DESCRIPTION OF THE PRIOR ART

Many prior art apparatus have been disclosed for use in conjunction with a flexible bag, or for otherwise accumulating or collecting debris or other matter. For example:

Lum U.S. Pat. No. 112,727 entitled "Bag Holder", issued on 3/14/1881, discloses shovel A, handles B, and flexible or slack bag C for holding and filling a bag with grain or other substances;

Richards U.S. Pat. No. 1,167,782 entitled "Grain Scoop", issued on 1/11/16, discloses a scoop-like structure including flat bottom member 10, vertical side members 11, upwardly bowed handle 14, and bag 18;

Olesburg U.S. Pat. No. 1,182,412 entitled "Combination Scoop And Sack Filler", issued on 5/9/16, discloses substantially semi-cylindrical member 10, first handle 21, and second handle 22;

Finocchiaro U.S. Pat. No. 3,106,303 entitled "Collapsible Cart", issued on 10/8/63, discloses cart 10, frames 18 and 20, wheels 30, and sheet material 24 and 26;

Anderson U.S. Pat. No. 3,754,785 entitled "Portable Bag Holder", issued on 8/28/73, discloses frame side elements 22, upper frame elements 20, lower support portion 12, lip 16, parallel members 24, and bag B;

Brenner and Hunt U.S. Pat. No. 3,875,981 entitled "Multi-Position Garden Cart", issued on 4/8/75, discloses garden cart A, bin B, parallel laterally spaced frames C, first eleongate member D, transversely aligned sleeves or bearings E, wheels F, U-shaped handle G, and hollow rigid frame H;

Paulus U.S. Pat. No. 3,939,803 entitled "Bag Distending And Supporting Apparatus", issued on 1/27/76, discloses bag B, and bag support 10 further including base portion 11, ends 12 and 13, guide slots 14 and 15, and stretcher member 18;

Alexander U.S. Pat. No. 3,936,087 entitled "Collection Receptacle", issued on 2/3/76, discloses collection receptacle 10, leaf and garden bag 11, base portion 14, top and bottom edges 16 and 17, side edges 18 and 19, stiffener rib portion 25, and scraper tray 30; and Beugin U.S. Pat. No. 4,006,928 entitled "Lawn Bag Caddy", issued on 2/8/77, discloses leg 10, legs 30, resilient sleeve 20, transverse opening 40, legs 18, and lawn bag 44.

From the above it is apparent that the prior art apparatus do not afford combined structural support and debris weight support; nor do they afford combined structural support, a debris guide function, and bag attachment function as does the present invention.

Objections of the present invention are therefor to provide an apparatus which:

allows for holding and filling an associated bag;

allows for one person to move debris and deposit same into an associated bag in one continuous operation;

is simple, economical, and lightweight for allowing the accumulation, collection, and deposition of debris into an associated bag;

allows for maintaining the mouth of the associated bag open in a vertical plane;

allows for collecting, receiving, and bagging lawn debris; and effects the above objects and which may be shipped disassembled, may be easily assembled, and later may be disassembled for storage.

SUMMARY OF THE INVENTION

According to the present invention, a debris accumulation and collection apparatus comprises: a rear frame structure; a front guide-holder structure; a front wheel-support structure; and a plurality of joint locations for connecting common, adjacent elements of the apparatus. In particular, the frame structure includes a plurality of rear, side, upper, and lower straight members; the guide-holder structure includes a front annular member, a central cylindrical member, and rear vertical and horizontal members; the wheel-support structure includes a bottom straight member and wheels at the ends of such bottom straight member; and the plurality of joint locations includes means for mutually connecting at least one end of respective frame structure straight members to other straight members or to such guide-holder structure.

Features of the present invention are therefor that:

the rear straight member, the upper and lower side straight members, and the lower cross members share a common joint location at the rear end of said apparatus;

the lower cross members serve the dual function of structural support and debris weight support;

the upper side straight members and the guide-holder structure share a common joint location at the upper horizontal portion of said guide-holder structure;

the lower side straight members, the lower cross members, the guide-holder structure, and the wheel-support structure share a common joint location at the lower horizontal portion of said guide-holder structure;

the upper side straight member is longer than the lower side straight member such that said guide-holder structure is in a vertical plane;

the upper side straight members and the rear straight member further include means for attaching an associated canvas or plastic sheet and direct the debris onto the guide-holder structure;

the rear straight member is longer than the distances between the front lower joint locations such that the debris is concentrated and directed onto the rear opening of the guide-holder structure;

the guide-holder structure is a unitary structure of molded plastic;

the common joint location of the rear straight member with the other members may include means for allowing manual transporting of the overall apparatus and debris load; and the intersection of the lower cross members and the middle portion of the rear straight member may include means for allowing assisted towing of the overall apparatus and debris load.

Advantages of the present invention are therefor that such apparatus is simple, economical, lightweight, and easy to manufacture, assemble, disassemble, and store.

DESCRIPTION OF THE DRAWING

The above and other objects, features, and advantages of the present invention will be better appreciated by a reading of the following detailed description and the drawing in which:

FIG. 1 is a perspective view of the present invention without the associated canvas or plastic sheet and without the associated plastic bag;

FIG. 2 is a perspective view of the present invention including such associated canvas or plastic sheet and including such associated plastic bag;

FIG. 3 is illustrative of the joint connection location at the rear straight member;

FIG. 4 is illustrative of the joint connection location at the upper horizontal portion of the guide-holder structure; and FIG. 5 is illustrative of the joint connection location at the lower horizontal portion of the guide-holder structure.

FIG. 1 is a perspective view of debris accumulation and collection apparatus 10 comprising: frame structure 20; joint connection locations 30; guide-holder structure 40; and wheel-support structure 50. For purposes of description only, the end of apparatus 10 including structure 40 is referred to as the front end and the other end is referred to as the rear end.

Frame structure 20 further comprises: rear lateral horizontal straight member 21; left and right upper longitudinal members 22 and 23, respectively; left and right lower longitudinal horizontal members 24 and 25, respectively; and first and second lower cross horizontal members 26 and 27, respectively. The longitudinal direction is defined as the front to rear direction while the lateral direction is horizontal and perpendicular to such longitudinal direction. Members 21 through 27 may be made of tubular material such as aluminum, plastic, or of any other material or configuration to meet the specific need and application.

Guide-holder structure 40 further comprises: front vertical annular member 41; middle cylindrical member 42 whose axis is longitudinally directed; and rear guide means 43 including left and right vertical side members 44 and 45, respectively, and upper and lower members 46 and 47, respectively. Guide-holder structure 40 may be made of one piece molded plastic or of any other material to meet the specific need and application.

Wheel-support structure 50 comprises: bottom horizontal lateral straight member 51; and vertical left and right wheels 52 and 53, respectively, attached to the respective ends of member 51.

FIG. 2 is a perspective view of apparatus 10 including associated canvas or plastic sheet 60 and associated flexible plastic bag 70. Members 22 and 23 respectively include means 22a and 23a along the lengths thereof for effecting attachment of edges 61 and 62 of sheet 60 to members 22 and 23. Similarly, member 21 includes means 21a along the length thereof for effecting attachment of edge 63 of sheet 60 thereto. Accordingly, horizontal area 64 and left and right vertical areas 65 and 66, respectively, of sheet 60 contain and direct the debris from the rear of apparatus 10 to the front of same and also guide the debris into member 42. Further, mouth area 71 of bag 70 fits over annular member 41 and onto the outer surface of member 42 with its own tension or applied tension to maintain bag 70 attached to apparatus 10 during the overall operation such that the mouth is in a vertical plane perpendicular to the longitudinal direction. It is apparent that cross members 26 and 27 provide weight support for the debris located on area 64 of sheet 60 and also provide structural support to apparatus 10.

FIG. 3 illustrates the joint connection locations between member 21, members 22 and 23, members 24 and 25, and members 26 and 27 at the rear end of apparatus 10 and at the left and right ends of member 21. The rear ends of all members may be flattened, stacked upon one another and on top of member 24, and fixedly connected to each other by means of bolt 31 and nut 32.

FIG. 4 illustrates the joint connection between members 22 and 23, and the left and right ends of upper member 46 of guide-holder structure 40. Again, the ends of members 22 and 23 are flattened, stacked upon the respective sides of member 46, and fixedly connected to member 46 by means such as bolt 33 and nut 34.

FIG. 5 illustrates the joint connection locations between members 24 and 25, members 26 and 27, member 47, and member 51. Again, the front ends of members 24, 25, 26, and 27 are flattened; members 24, 25, 26, 27, 47, and 51 are stacked upon one another and fixedly connected to each other by means such bolt 35 and nut 36.

It is apparent that the length of member 21 is greater than the distance between the joint connection locations on upper member 46 and the joint connection locations on lower member 47. It is also apparent that the length of upper members 22 and 23 is greater than the length of lower members 24 and 25. Further, the distance between the rear edges of upper and lower members 46 and 47 is greater than the distance between their front edges. Similarly, the distance between the rear edges of members 44 and 45 is greater than the distance between their front edges. Further, guide-holder structure 40 may be a unitary structure of plastic or any other suitable material or may be separate parts 41, 42, and 43 being rivetted, stapled, or otherwise joined together to meet the particular application.

The operation of appartus 10 is such that the operator sweeps or rakes the debris onto apparatus 10 from the rear to the front direction onto area 63 to accumulate and collect such debris thereon. The operator then effects forward movement of the debris along area 64, and along guide means 43, member 42, and into bag 70. The operator may then remove and replace bag 70 as necessary.

Apparatus 10 may further include means at the common joint connection locations of member 21 such as a handle for allowing manual transporting of apparatus 10 and the debris thereon. Further, apparatus 10 may further include means at the common joint connection locations of members 26 and 27, and at the middle portion of member 21 such as a longitudinal bar for allowing assisted towing of apparatus 10 and the debris thereon.

Appartus 10 has been described as a lawn apparatus for accumulating and collecting grass, leaves, twigs, etc. However, it will be apparent that apparatus 10 can be used to accumulate and collect any debris such as garbage, sand, etc.

While the arrangement according to the present invention has been described in terms of a specific illustrative embodiment, it will be apparent to those skilled in the art that many modifications are possible within the spirit and scope of the disclosed principle.

What is claimed is:

1. An apparatus having a front end and a rear end comprising:
   a guide-holder structure being located at the front end of said apparatus and defining a front opening which is perpendicular to the longitudinal direction of said apparatus, said longitudinal direction being defined as the front to rear direction; and
   a frame structure being located at the rear end of said apparatus and including a base portion which is perpendicular to said opening, the rear end of said guide-holder structure being connected to the front end of said frame structure at first and second connection locations which are located along the plane of said base portion;
   wherein said guide-holder structure further comprises:
   a front annular member defining said opening and being perpendicular to said longitudinal direction;
   a central cylindrical member being concentric with and being located at the rear end of said annular member; and
   a plurality of guide members being located at the rear end of said cylindrical member and at the front end of said frame structure; first and second guide members being perpendicular to said base portion, the distance between the rear ends of said first and second guide members being greater than the distance between the front ends, and third and fourth guide members being parallel to said base portion, said third guide member being located along the plane of said base portion, the connections between said guide-holder structure and said frame structure including said first and second connection locations and being located on said third guide member.

2. The apparatus of claim 1 wherein said frame structure further comprises a plurality of straight members, first and second straight members being connected to said first connection location; third and fourth straight members being connected to said second connection location; a fifth straight member being connected to said guide-holder structure at a third connection location above said first connection location being a certain perpendicular distance from said base portion; a sixth straight member being connected to said guide-holder structure at a fourth connection location above said second connection location being said certain perpendicular distance from said base portion; and a seventh straight member being parallel to said base portion and along the plane thereof and being perpendicular to said longitudinal direction for connecting the rear ends of said second, third, and sixth straight members; the distance between the connection locations on said seventh member being greater than the distance between said first and second connection locations; and said base portion including said second and fourth straight members.

3. The apparatus of claim 1 also comprising a wheel-support structure being connected to the rear end of said guide-holder structure and to the front end of said frame structure at said first and second connection locations, wherein said wheel-support structure further comprises a lateral straight member being connected to said first and second connection locations; and first and second wheel members being respectively connected to the first and second ends of said lateral straight member, said first and second wheel members being perpendicular to said base portion and parallel to said longitudinal direction.

4. The apparatus of claim 2 also comprising a wheel-support structure being connected to the rear end of said guide-holder structure and to the front end of said frame structure at said first and second connection locations, wherein said wheel-support structure further comprises a lateral straight member being connected to said first and second connection locations; and first and second wheel members being respectively connected to the first and second ends of said lateral straight member, said first and second wheel members being perpendicular to said base portion and parallel to said longitudinal direction.

5. An apparatus having a front end and a rear end comprising:
   a guide-holder structure being located at the front end of said apparatus and defining a front opening which is perpendicular to the longitudinal direction of said apparatus, said longitudinal direction being defined as the front to rear direction; and
   a frame structure being located at the rear of said apparatus and including a base portion which is perpendicular to said opening, the rear end of said guide-holder structure being connected to the front end of said frame structure at first and second connection locations which are located along the plane of said base portion;
   wherein said frame structure further comprises a plurality of straight members, first and second straight members being connected to said first connection location; third and fourth straight members being connected to said second connection location; a fifth straight member being connected to said guide-holder structure at a third connection location above said first connection location being a certain perpendicular distance from said base portion; a sixth straight member being connected to said guide-holder structure at a fourth connection location above said second connection location being said certain perpendicular distance from said base portion; and a seventh straight member being parallel to said base portion and along the plane thereof and being perpendicular to said longitudinal direction for connecting the rear ends of said second, third, and sixth straight members; the distance between the connection locations on said seventh member being greater than the distance between said first and second connection locations; and said base portion including said second and fourth straight members.

6. The apparatus of claim 5 also comprising a wheel-support structure being connected to the rear end of said guide-holder structure and to the front end of said frame structure at said first and second connection locations;
   wherein said wheel-support structure further comprises a lateral straight member being connected to said first and second connection locations; and first and second wheel members being respectively connected to the first and second ends of said lateral straight member, said first and second wheel members being perpendicular to said base portion and parallel to said longitudinal direction.

* * * * *